United States Patent
Talty et al.

(10) Patent No.: US 9,515,753 B2
(45) Date of Patent: Dec. 6, 2016

(54) AM/FM ANTENNA PERFORMANCE IN THE PRESENCE OF WIDE-BAND NOISE USING TUNABLE HIGH-Q STRUCTURES

(71) Applicants: GM GLOBAL TECHNOLOGY OPERATIONS LLC, Detroit, MI (US); KATHREIN AUTOMOTIVE NORTH AMERICA, INC., Rochester Hills, MI (US)

(72) Inventors: Timothy J. Talty, Beverly Hills, MI (US); Gregg R. Kittinger, Pontiac, MI (US); Andreas Fuchs, Lake Orion, MI (US); Elias Ghafari, Rochester Hills, MI (US)

(73) Assignees: GM Global Technology Operations LLC, Detroit, MI (US); KATHREIN AUTOMOTIVE NORTH AMERICA, INC., Rochester Hills, MI (US)

( * ) Notice: Subject to any disclaimer, the term of this patent is extended or adjusted under 35 U.S.C. 154(b) by 0 days.

(21) Appl. No.: 14/699,662

(22) Filed: Apr. 29, 2015

(65) Prior Publication Data
US 2015/0326330 A1   Nov. 12, 2015

Related U.S. Application Data

(60) Provisional application No. 61/989,983, filed on May 7, 2014.

(51) Int. Cl.
*H04B 1/18* (2006.01)
*H05K 11/02* (2006.01)
(Continued)

(52) U.S. Cl.
CPC ............ *H04H 40/72* (2013.01); *H01Q 1/3208* (2013.01); *H01Q 5/321* (2015.01); *H04B 1/18* (2013.01)

(58) Field of Classification Search
CPC ....... H04B 1/082; H04B 1/20; H04B 7/18523; H04N 5/44; H04N 5/64; H01Q 1/3208
(Continued)

(56) References Cited

U.S. PATENT DOCUMENTS

| | | | | |
|---|---|---|---|---|
| 5,812,066 | A * | 9/1998 | Terk | ........................ H01Q 9/145 340/12.17 |
| 6,424,816 | B1 * | 7/2002 | Stephens | ............ H04B 7/18523 455/2.01 |

(Continued)

*Primary Examiner* — Simon Nguyen
(74) *Attorney, Agent, or Firm* — John A. Miller; Miller IP Group, PLC

(57) ABSTRACT

An AM/FM radio system for a vehicle that is selectively impedance matched to the particular tuned frequency of interest so that noise received by other frequencies does not affect the received signal. The radio system includes an HMI allowing a user to select an AM or FM radio station and a radio tuner responsive to a signal from the HMI identifying the selected radio station. The tuner tunes the radio system to the radio station, and provides a signal to the HMI identifying the radio station. The HMI places a message on a vehicle bus identifying the radio station that the radio tuner is tuned to. An antenna controller receives the message from the vehicle bus to selectively control an impedance matrix to provide impedance matching for the selected radio station frequency. The antenna controller also selectively tunes antenna radiating elements to the particular tuned frequency.

20 Claims, 3 Drawing Sheets

(51) Int. Cl.
*H04H 40/72* (2008.01)
*H01Q 1/32* (2006.01)
*H01Q 5/321* (2015.01)

(58) Field of Classification Search
USPC .................. 455/150.1, 152.1, 179.1, 180.1, 154.1, 455/345
See application file for complete search history.

(56) References Cited

U.S. PATENT DOCUMENTS

| | | | |
|---|---|---|---|
| 6,829,475 B1* | 12/2004 | Lee .................. | G01C 21/26 455/345 |
| 2002/0154059 A1* | 10/2002 | Lindenmeier ........ | H04B 7/0808 342/374 |
| 2005/0020223 A1* | 1/2005 | Ellis .................. | H04B 1/20 455/186.1 |
| 2005/0097154 A1* | 5/2005 | Tsecouras .............. | H04B 15/00 708/300 |
| 2007/0060082 A1* | 3/2007 | Okumura .............. | H03J 1/0008 455/179.1 |
| 2008/0192807 A1* | 8/2008 | Castaneda .............. | H03D 3/002 375/136 |
| 2009/0299572 A1* | 12/2009 | Fujikawa ............... | G01C 21/26 701/36 |
| 2010/0056089 A1* | 3/2010 | Tadayon ................. | H04B 1/08 455/196.1 |
| 2011/0216248 A1* | 9/2011 | Chen ........................ | H04B 1/18 348/731 |
| 2014/0327834 A1* | 11/2014 | Takaki ................... | H04H 60/32 348/731 |

* cited by examiner

AM/FM ANTENNA PERFORMANCE IN THE PRESENCE OF WIDE-BAND NOISE USING TUNABLE HIGH-Q STRUCTURES

CROSS-REFERENCE TO RELATED APPLICATIONS

This application claims the benefit of the priority date of U.S. Provisional Patent Application Ser. No. 61/989,983, titled, Improved AM/FM Antenna Performance in the Presence of Wide-Band Noise Using Tunable High-Q Structures, filed May 7, 2014.

BACKGROUND OF THE INVENTION

Field of the Invention

This invention relates generally to radio systems and, more particularly, to radio systems for a vehicle that employ a high Q-factor narrow-band antenna that is tunable to a selected radio station.

Discussion of the Related Art

Vehicles can include AM/FM radio, TV and other wireless services having antennas that are tunable to, for example, amplitude modulated (AM) radio broadcast signals and frequency modulated (FM) radio broadcast signals and various modulations used worldwide for television signals. Different countries may identify AM, FM, TV and other wireless frequency bands, and frequency steps within those bands, differently. As an example, in the United States, AM signals are broadcast in the 540-1700 kHz frequency range, where each station in a particular area is assigned a 10 kHz channel in that range. Also, in the United States, FM signals are broadcast in the 88-108 MHz frequency range, where each station in a particular area is assigned a 200 kHz channel in that range. Vehicles also may employ other wideband broadcast frequency bands, such as Band 3 and TV bands.

Typically, radio antennas for vehicles are often low Q-factor broadband antennas that are able to receive broadcast signals over the entire, and normally wide, frequency band. The Q-factor is sometimes defined with respect to the bandwidth of operation of the radio. For example, the Q-factor is often known to RF engineers as the ratio of the operating bandwidth to the center frequency of the operational bandwidth. In this definition, a lower Q-factor device will have a larger operational bandwidth than a higher Q-factor device with the same center frequency.

Employing broadband antennas for vehicle radios has typically been necessary because information about which particular channel the radio is tuned to was not available. For example, because it is necessary to design AM and FM antennas to receive signals across the entire AM or FM frequency band, those antennas typically had a low performance because the impedance matching between the antenna and the front end receiver components needed to be designed to accommodate the entire frequency range. Further, noise received over the entire frequency band was processed by the receiver front end even though the radio was only tuned to a small bandwidth of that frequency band. This is also true for the other wireless broadcast services (e.g. television).

Since most vehicles have metallic skins and other metal structures, they are able to effectively shield or reduce noise over the desired frequency band that the antenna was exposed to (e.g. AM, FM, TV or other wireless services). However, with the popularity of composite structures in high performance vehicles, that signal shielding has become less available, and with the increasing number of electronics on those types of vehicles, the potential for interference from noise over the wider frequency band increases. Thus, antennas are exposed to higher levels of noise, often referred to as radiated emissions since the noise is radiated from other electronic modules on the vehicle.

SUMMARY OF THE INVENTION

The present disclosure describes an audio and/or visual system, such as AM/FM radio, TV or other wireless system, for a mobile platform, such as a vehicle, where the system is selectively impedance matched to the particular tuned frequency of interest so that noise received by other frequencies does not affect the received signal. In one embodiment, the system includes a human machine interface (HMI) allowing a user to select a desired station and a tuner responsive to a signal from the HMI identifying the selected station. The tuner tunes the system to the station, and provides a signal to the HMI identifying the station. The HMI places a message on a bus identifying the station from which the desired frequency band of the station the tuner is tuned to. An antenna controller receives the message from the bus to selectively control an impedance matrix to provide impedance matching for the selected radio station frequency. The antenna controller also selectively tunes antenna radiating elements to the particular tuned frequency.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an audio and/or visual system, such as a radio system, for a vehicle that uses vehicle messages to identify which station the radio is tuned to so as to selectively control antenna element tuning is merely exemplary in nature, and is in no way intended to limit the invention or its applications or uses. For example, the discussion herein describes the audio and/or visual system as being a vehicle radio system. However, the audio and/or visual system may have application for other mobile platforms or non-mobile structures.

Figure 1:
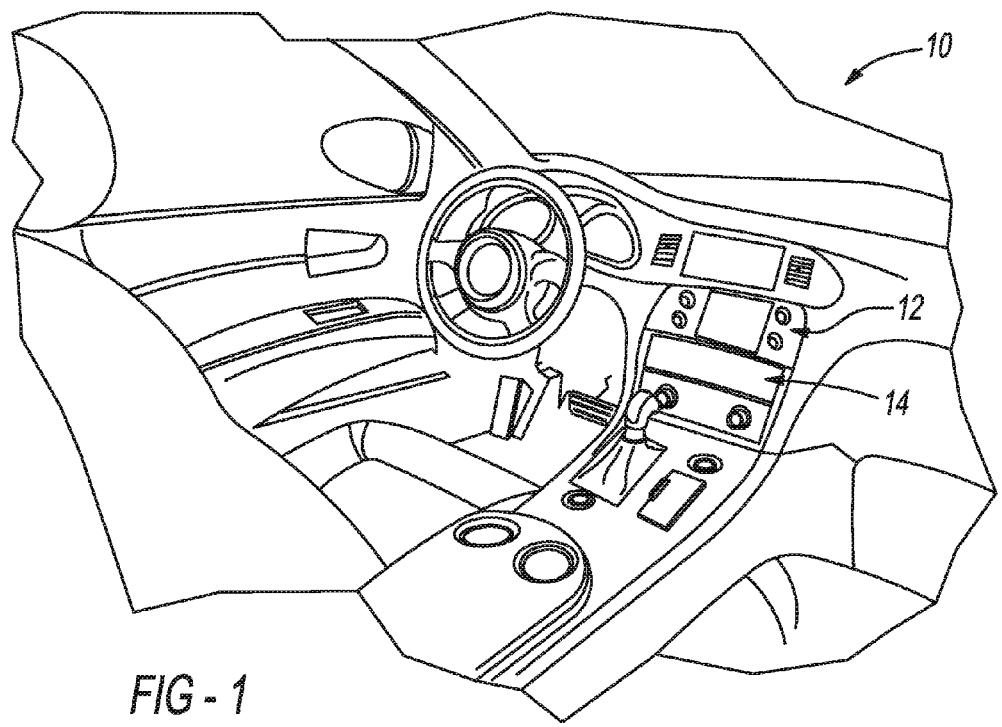
FIG. 1 is a broken-away interior view of a vehicle including an AM/FM radio.

FIG. 1 is a broken-away interior view of a driver area of a vehicle 10 showing various user controls, such as a human machine interface (HMI) 12 and an AM/FM radio 14. The vehicle 10 may include other broadband broadcast and/or wireless devices, such as Band 3 and TV.

Figure 2:
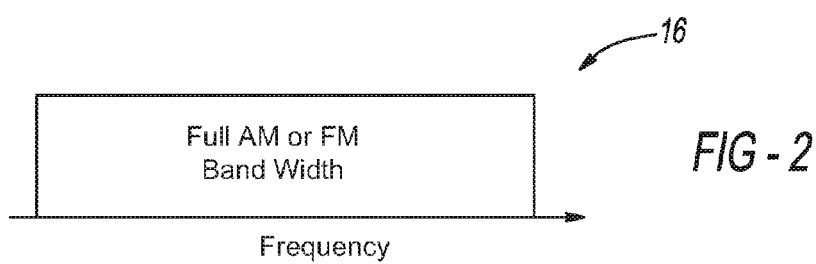
FIG. 2 is an illustration of a wide frequency band.

FIG. 2 is an illustration of a frequency band 16 for a particular vehicle radio, which could be an FM frequency band having a range of 88-108 MHz, or an AM frequency band having a range of 540-1700 kHz. As discussed above, a typical vehicle radio having an antenna for an AM or FM frequency band would be a wideband low Q-factor antenna that was able to receive and process signals over the entire frequency band regardless of which particular radio station the radio tuner may be tuned to. It is noted that the discussion herein refers to the AM and FM frequency bands. However, the invention will have application to any wide frequency broadband audio and/or visual device, including, but not limited to, Band 3 and TV band devices.

As mentioned, for most previous vehicles, the identification as to which station the radio 14 was tuned to is not available as an input to other vehicle systems. Modern vehicles, however, often provide information about the specific station that the radio is tuned to, such as type of music, particular artist, song title, etc., as a controller area network (CAN) message on a vehicle bus, or some other vehicle bus, such as local interconnect network (LIN) bus or Ethernet bus, which is displayed on the vehicle instrument cluster for the operator to see. Therefore, the information concerning which radio station the radio 14 is tuned to is readily available on one or more of the vehicle buses.

Figure 3:
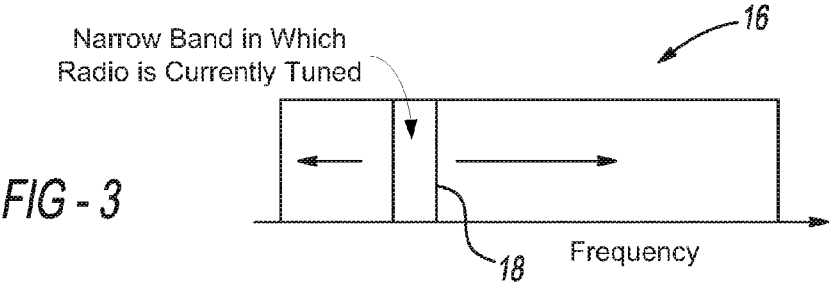
FIG. 3 is an illustration of a narrow frequency band within the wide frequency band.

The present invention proposes using the available information about radio tuning to cause a tunable antenna associated with the system to be specifically impedance matched to that narrow frequency band so as to eliminate noise that would otherwise be received by the antenna outside of the selected frequency, which could reduce the performance of the radio 14. FIG. 3 shows the frequency band 16, but where a narrow portion 18 of the band 16 is selectively moved along the band 16 as an indication of which narrow-band the antenna needs to be tuned to at any particular point in time. Thus, the antenna does not need to be a wideband antenna, but instead needs to be able to be tuned to a narrow frequency band within the entire band 16 for the particular application.

Figure 4:
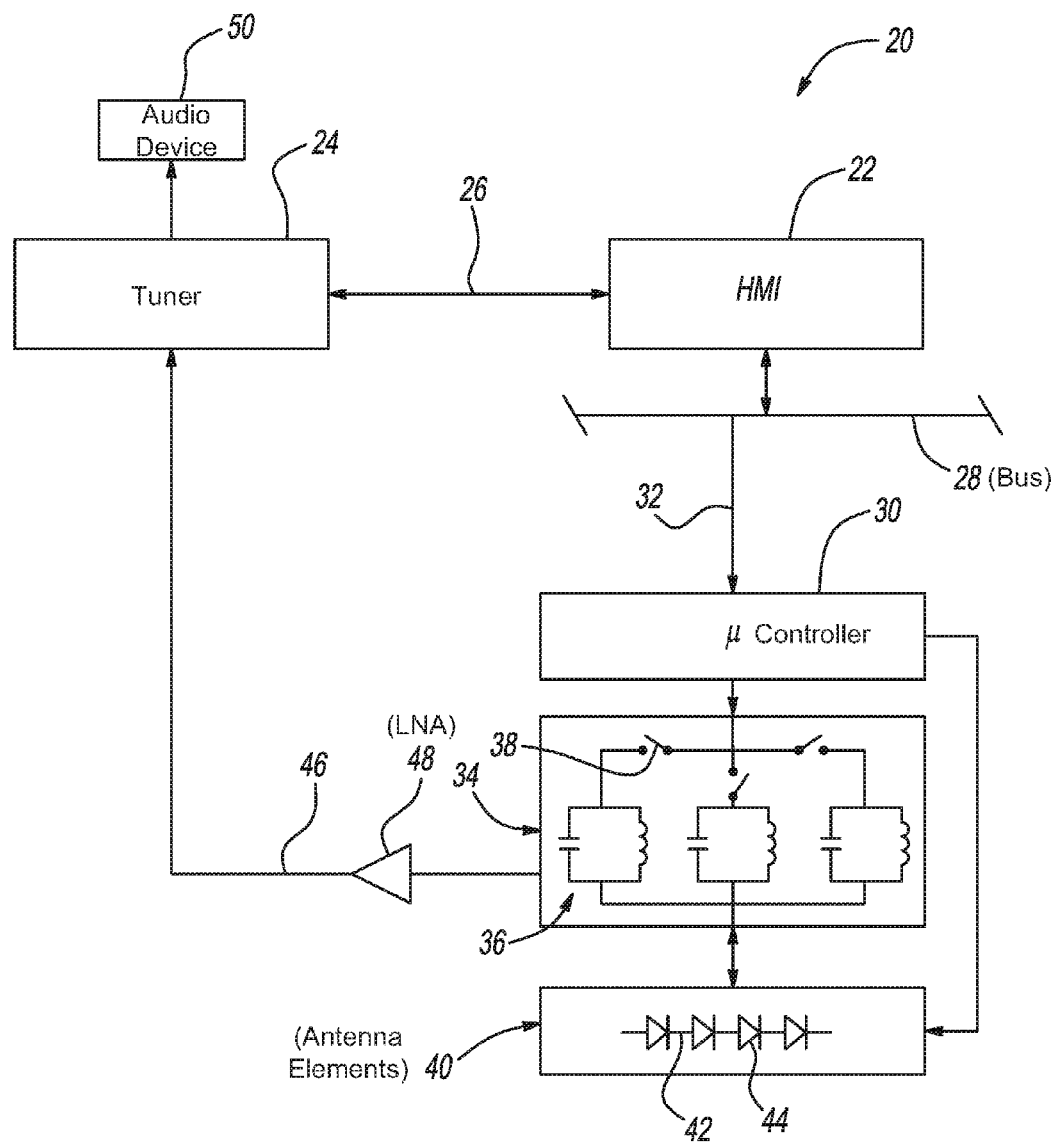
FIG. 4 is a block diagram of a radio system that uses existing tuning information to tune an antenna.

FIG. 4 is a schematic block diagram of a radio system 20 that provides narrow-band antenna reception as discussed above. The radio system 20 includes an HMI 22, such as may be part of a vehicle instrument cluster, that allows the vehicle operator to select which radio station he or she desires the radio 14 to be tuned to. That signal is provided to a radio tuner 24 on line 26 that causes the radio tuner 24 to tune the radio system 20 to that particular radio station. Once the radio tuner 24 is tuned to the desired station it sends a signal back to the HMI 22 identifying the station that it is tuned to and other information about that station, such as song title, artist, type of station, etc. The HMI 22, or the radio tuner 24, puts a message on a vehicle bus 28 that is available to other vehicle systems, such as a display.

The radio system 20 includes an antenna controller 30 that receives a signal from the bus 28 on line 32 identifying which station the tuner 24 has been tuned to. The antenna controller 30 provides a control signal to an impedance matching matrix 34 that selects a particular resonant tuning circuit 36 for the selected station through switches 38, where the other resonant tuning circuits 36 within the impedance matching matrix 34 are not part of the circuit for that particular selected station. It is noted that the tuning circuits 36 in the impedance matching matrix 34 are depicted by way of a non-limiting example in that other electrical resonating architectures, such as biased transistors, micro-electromechanical structures (MEMS), etc., can also be employed. Further, while switching is depicted as a method to tune the impedance matching matrix 34, those skilled in the art will understand that tuning the impedance matching matrix 34 could also be accomplished by selecting various operating points by adjusting the bias to electronic components, thus varying the quiescent operation point, and hence the effective impedance.

The controller 30 also selects a particular configuration of radiating antenna elements 40 that receive the broadcast signals for that station. In this non-limiting example, the radiating elements 40 are represented as sections 42 of a dipole antenna separated by PIN switches 44 that can be selectively connected or disconnected from the antenna to change its length. The signals received by the radiating elements 40 for the particular tuning circuit 36 are provided to the impedance matching matrix 34 to be output on line 46, such as a coaxial cable, to be sent to the radio tuner 24, where they are processed into audio signals. low noise amplifier (LNA) 48 in the line 46 amplifies the received signals before being sent to the tuner 24. The tuner 24 processes the received RF signals in a well known manner to be output to an audio device 50.

Figure 5:
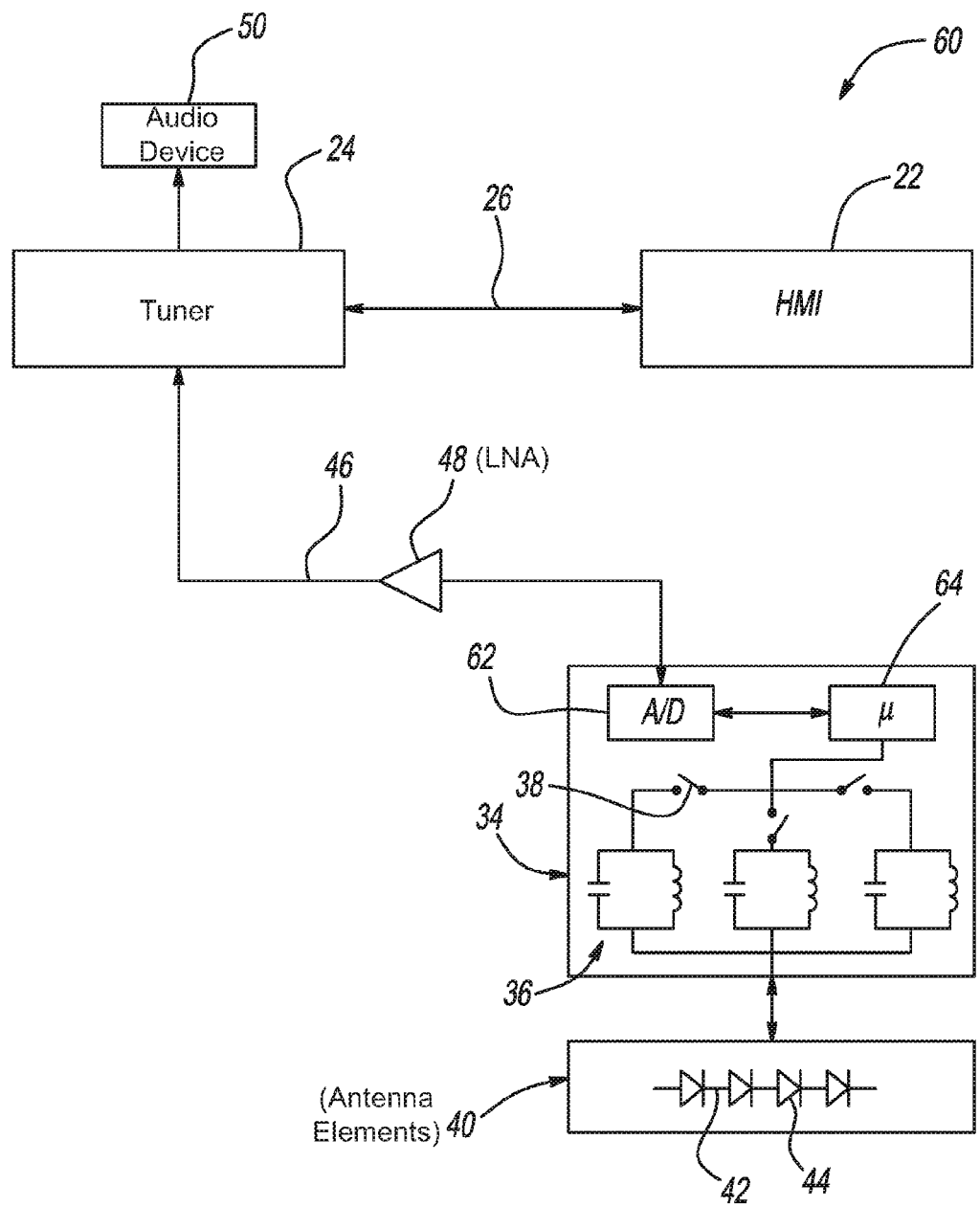
FIG. 5 is a block diagram of a radio system that uses existing tuning information from a radio frequency tuner to tune an antenna.

Although the embodiment discussed above includes placing the radio station information as a message on the vehicle bus 28 to be identified by the antenna controller 30, in an alternate embodiment, the controller 30 can be eliminated, where the particular radio station tuned by the tuner 24 is provided as an analog signal, i.e., voltage level, onto the coaxial cable line 46 to be received by the impedance matching matrix 34 to selectively tune the radiating elements 38. FIG. 5 is a block diagram of a radio system 60 showing this embodiment, where like elements to the system 20 are identified by the same reference number. In the system 60, the impedance matching matrix 34 includes an analog-to-digital (ND) converter 62 that converts the voltage level identifying the radio station on the line 46 to a digital signal to be processed by a microcontroller 64 in the impedance matching matrix 34. The microcontroller 64 then tunes the radiating elements 40.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An audio and/or visual system, said system comprising:
a human machine interface (HMI) allowing a user to select a station;
a tuner responsive to a signal from the HMI identifying the selected station and tuning the system to the station, said tuner providing a signal to the HMI identifying the selected station;
a bus responsive to a message from the HMI or tuner identifying the station that the tuner is tuned to;
an antenna controller receiving the message from the bus;

an impedance matching matrix receiving a control signal from the antenna controller identifying the station, said impedance matching matrix selecting an impedance circuit from a switch-selectable set of impedance circuits in the matrix for the station; and an antenna including a plurality of antenna elements separated by PIN switches, where the antenna receives control signals from the antenna controller and adjusts a length of the antenna by connecting a number of the antenna elements to tune the antenna to a frequency for the station.

2. The system according to claim 1 wherein the system is an AM radio system where the impedance matching matrix and the plurality of antenna elements are selectively tuned to an AM radio station in the AM frequency band.

3. The system according to claim 1 wherein the system is an FM radio system where the impedance matching matrix and the plurality of antenna elements are selectively tuned to an FM radio station in the FM frequency band.

4. The system according to claim 1 wherein the system is a Band 3 radio system where the impedance matching matrix and the plurality of antenna elements are selectively tuned to a Band 3 radio station in the Band 3 frequency band.

5. The system according to claim 1 wherein the system is a TV system where the impedance matching matrix and the plurality of antenna elements are selectively tuned to a TV station in the TV frequency band.

6. The system according to claim 1 wherein the system is a wireless broadband system with tunable channels where the impedance matching matrix and the plurality of antenna elements are selectively tuned to a desired station among a wider frequency band.

7. The system according to claim 1 wherein the system is on a vehicle.

8. The system according to claim 7 wherein the vehicle includes a composite skin.

9. An audio and/or visual system for a vehicle, said system comprising:
　a tuner responsive to a signal identifying a selected station and tuning the system to the station;
　an impedance matching matrix receiving a signal on a signal line from the tuner identifying the station that the system is tuned to, said impedance matching matrix selecting an impedance circuit from a switch-selectable set of impedance circuits in the matrix for the selected station; and
　an antenna including a plurality of antenna elements separated by PIN switches, where a length of the antenna is determined by a connected number of the antenna elements and is selectively tuned to the station based on the selected impedance circuit, and where the antenna provides a received station signal on the signal line to the tuner.

10. The system according to claim 9 wherein the signal line is a coaxial cable.

11. The system according to claim 9 wherein the system is an AM radio system where the impedance matching matrix and the plurality of antenna elements are selectively tuned to an AM radio station in the AM frequency band.

12. The system according to claim 9 wherein the system is an FM radio system where the impedance matching matrix and the plurality of antenna elements are selectively tuned to an FM radio station in the FM frequency band.

13. The system according to claim 9 wherein the system is a Band 3 radio system where the impedance matching matrix and the plurality of antenna elements are selectively tuned to a Band 3 radio station in the Band 3 frequency band.

14. The system according to claim 9 wherein the system is a TV system where the impedance matching matrix and the plurality of antenna elements are selectively tuned to a TV station in the TV frequency band.

15. The system according to claim 9 wherein the system is a wireless broadband system where the impedance matching matrix and the plurality of antenna elements are selectively tuned to a desired station among a wider frequency band.

16. The system according to claim 9 wherein the impedance matrix includes an analog-to-digital convertor for converting analog tuning signals from the tuner to digital signals.

17. The system according to claim 9 wherein the vehicle includes a composite skin.

18. radio system for a vehicle, said system comprising:
　a human machine interface (HMI) allowing a vehicle user to select a radio station;
　a tuner responsive to a signal from the HMI identifying the selected radio station and tuning the radio system to the radio station, said tuner providing a signal to the HMI identifying the selected radio station;
　a vehicle bus responsive to a message from the HMI or the tuner identifying the radio station that the radio tuner is tuned to;
　an antenna controller receiving the message from the vehicle bus;
　an impedance matching matrix receiving a control signal from the antenna controller identifying the radio station, said impedance matching matrix selecting an impedance circuit from a switch-selectable set of impedance circuits in the matrix for the radio station; and
　an antenna including a plurality of antenna elements separated by PIN switches, where the antenna receives a control signal from the antenna controller and adjusts a length of the antenna by connecting a number of the antenna elements to tune the antenna to a frequency for the radio station.

19. The radio system according to claim 18 wherein the system is selected from the group consisting of an AM radio system where the impedance matching matrix and the plurality of antenna elements are selectively tuned to an AM radio station in the AM frequency band, an FM radio system where the impedance matching matrix and the plurality of antenna elements are selectively tuned to an FM radio station in the FM frequency band, a Band 3 radio system where the impedance matching matrix and the plurality of antenna elements are selectively tuned to a Band 3 radio station in the Band 3 frequency, and a wireless broadband system where the impedance matching matrix and the plurality of antenna elements are selectively tuned to a desired station among a wider frequency band.

20. The radio system according to claim 18 wherein the vehicle includes a composite skin.

* * * * *